United States Patent
Kakuya et al.

(10) Patent No.: US 7,893,691 B2
(45) Date of Patent: Feb. 22, 2011

(54) ELECTROMAGNETIC IMPEDANCE SENSOR AND PASSENGER PROTECTION SYSTEM

(75) Inventors: Yuuji Kakuya, Okazaki (JP); Masanori Kawaura, Nukata-gun (JP); Norio Sanma, Okazaki (JP); Toshihito Nonaka, Chiryu (JP); Kyojiro Suzuki, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 432 days.

(21) Appl. No.: 12/009,784

(22) Filed: Jan. 22, 2008

(65) Prior Publication Data

US 2008/0180091 A1 Jul. 31, 2008

(30) Foreign Application Priority Data

Jan. 25, 2007 (JP) ............................. 2007-015431
Nov. 29, 2007 (JP) ............................. 2007-308698

(51) Int. Cl.
*G01N 27/72* (2006.01)
*G01N 27/82* (2006.01)
*G01R 33/12* (2006.01)

(52) U.S. Cl. ...................... 324/239; 324/228; 324/240

(58) Field of Classification Search ............ 324/207.15, 324/207.16, 207.17, 207.18, 207.24, 207.25, 324/207.26, 222, 228, 232, 239; 336/226, 336/227, 232

See application file for complete search history.

(56) References Cited

U.S. PATENT DOCUMENTS

| | | | |
|---|---|---|---|
| 3,953,816 A | 4/1976 | Hennequin | |
| 4,590,426 A | 5/1986 | Lutes | |
| 4,918,418 A | 4/1990 | Tsala | |
| 7,323,863 B2 * | 1/2008 | Mawet | ................... 324/207.15 |
| 7,388,370 B2 * | 6/2008 | Cech et al. | ................... 324/239 |
| 2005/0030010 A1 | 2/2005 | Jones et al. | |
| 2006/0119351 A1 | 6/2006 | James et al. | |
| 2006/0125472 A1 | 6/2006 | Howard et al. | |

FOREIGN PATENT DOCUMENTS

| | | |
|---|---|---|
| DE | 2 350 924 | 4/1974 |
| JP | 06-339471 | 12/1994 |
| JP | 07-255700 | 10/1995 |
| JP | 09-175319 | 7/1997 |
| JP | 11-281719 | 10/1999 |

OTHER PUBLICATIONS

Office action dated May 11, 2009 in German Application No. 10 2008 005 348.1.

* cited by examiner

*Primary Examiner*—Kenneth J Whittington
(74) *Attorney, Agent, or Firm*—Harness, Dickey & Pierce, P.L.C.

(57) ABSTRACT

An electromagnetic impedance sensor detects an object made of conducting material or soft magnetic material with contact-free. The sensor includes: a detection coil; and a detection circuit for supplying electricity to the coil and for measuring electromagnetic impedance change in the coil. The detection coil includes multiple coil portions provided by one wire. One coil portion has a side adjacent to a corresponding side of another coil portion. The side and the corresponding side extend along with a direction, and the side has a current flowing direction, which is the same as the corresponding side.

15 Claims, 6 Drawing Sheets

_US 7,893,691 B2_

ELECTROMAGNETIC IMPEDANCE SENSOR AND PASSENGER PROTECTION SYSTEM

CROSS REFERENCE TO RELATED APPLICATIONS

This application is based on Japanese Patent Applications No. 2007-15431 filed on Jan. 25, 2007, and No. 2007-308698 filed on Nov. 29, 2007, the disclosures of which are incorporated herein by reference.

FIELD OF THE INVENTION

The present invention relates to an electromagnetic impedance sensor and a passenger protection system.

BACKGROUND OF THE INVENTION

An electromagnetic impedance sensor for detecting a detection object by using a coil, i.e., a search coil. Specifically, when the detection object is made of conductor or soft magnetic material, and the detection object approaches the search coil, an impedance of the search coil changes, so that the detection object is detected based on impedance change. This sensor is disclosed in, for example, JP-A-H09-175319.

The conventional sensor has a difficulty that detection sensitivity may disperse with reference to a position of the detection object in a detection space when the detection space is comparatively large in view of dimensions of the detection object. Here, the sensor can detect the object in the detection space.

This is because the detection sensitivity fluctuates with reference to a relationship between the position of the detection object in the space and the coil arrangement of the search coil. The search coil is arranged in the detection space to face the detection space in order to cover the detection space. Specifically, since magnetic flux at each portion of the detection space may disperse along with a direction in parallel to a coil surface of the coil, the detection sensitivity fluctuates.

Thus, it is required for the sensor to have high detection accuracy.

SUMMARY OF THE INVENTION

In view of the above-described problem, it is an object of the present disclosure to provide an electromagnetic impedance sensor. It is another object of the present disclosure to provide a passenger protection system.

According to a first aspect of the present disclosure, an electromagnetic impedance sensor detects an object with contact-free. The object is made of conducting material or soft magnetic material. The sensor includes: a detection coil having a coil surface, which faces a detection area in which the object is disposed; and a detection circuit for supplying alternating electricity to the detection coil and for detecting the object by measuring change of an electromagnetic impedance in the detection coil. The detection coil includes a plurality of coil portions, which are provided by one wire. Each coil portion is disposed on the coil surface to have a predetermined arrangement. The plurality of coil portions is sequentially arranged along with a first direction.

In the above system, the passenger protection element surely functions based on the signal from the electromagnetic impedance sensor, which has detection accuracy.

According to a second aspect of the present disclosure, a passenger protection system includes: the electromagnetic impedance sensor according to the first aspect of the present disclosure; a collision determination element for determining collision between the vehicle and an external body based on an output from the sensor; and a passenger protection element for protecting a passenger of a vehicle. The passenger protection element functions based on determination of the collision determination element.

In the above system, the passenger protection element surely functions based on the signal from the electromagnetic impedance sensor, which has detection accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
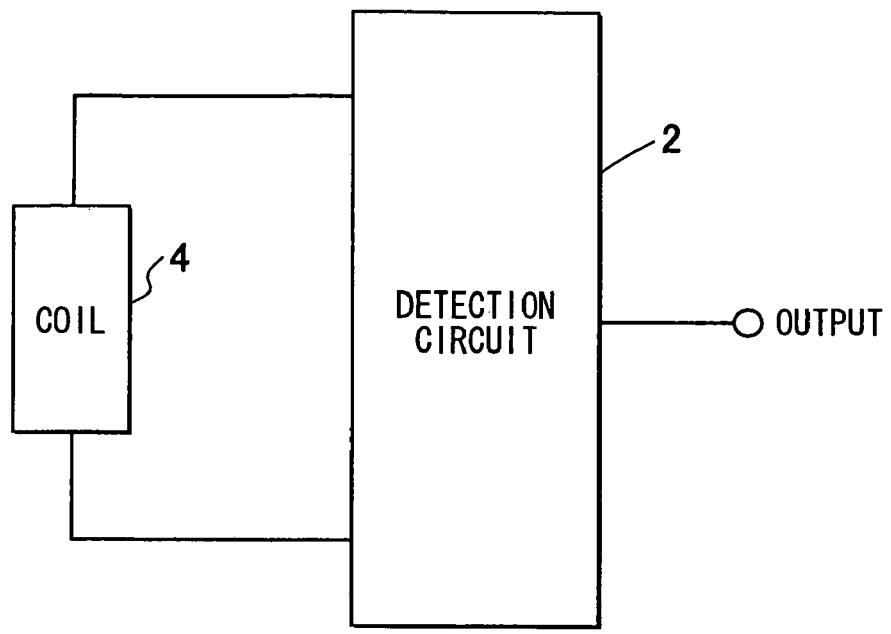
FIG. 1 is a circuit diagram of an electromagnetic impedance sensor.
Figure 2:
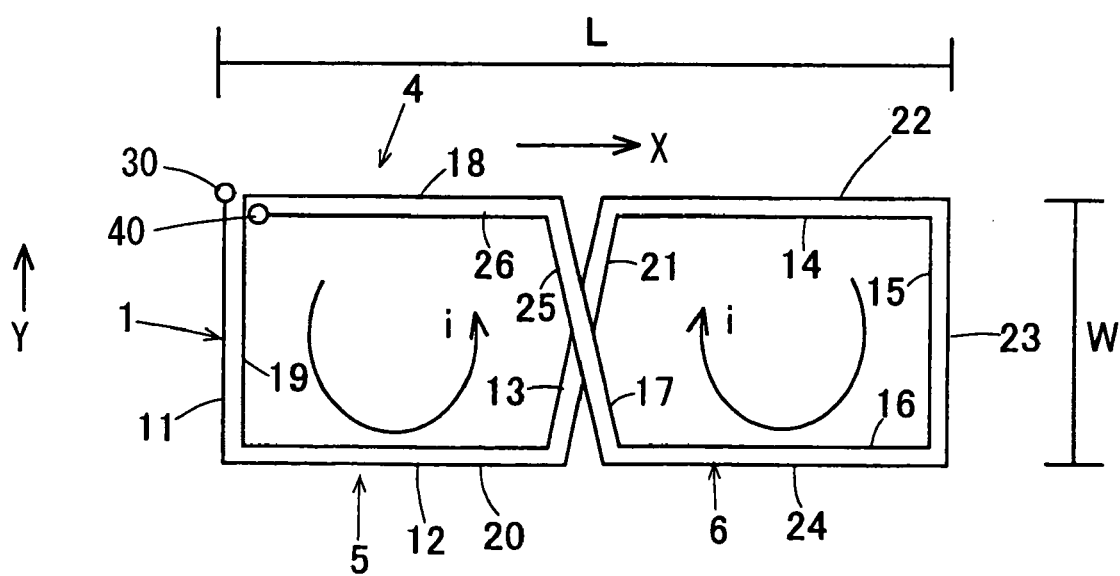
FIG. 2 is a plan view showing a detection coil in the sensor according to a first embodiment of the present disclosure.

An electromagnetic impedance sensor according to a first embodiment of the present disclosure is shown in FIGS. 1 and 2. The sensor is, for example, an eddy-current detection sensor for detecting a conductor.

FIG. 1 shows a circuit of the sensor. The sensor includes a detection circuit 2 and a detection coil 4. The detection circuit 2 energizes the detection coil to supply high frequency current having a high frequency in a range between a few kHz and a few MHz. Further, the detection circuit 2 detects supply current change in accordance with impedance change of the coil 4. The coil surface, i.e., the coil opening surface of the coil 4 is arranged to face a detection space (not shown).

The supply current change is detected by measuring a voltage drop of a current detecting resistor. Alternatively, the inductance of the coil 4 and the capacitance of a capacitor connecting to the coil 4 may provide a self-oscillation circuit such as a Colpitts circuit, and the supply current change is detected by measuring frequency change of the self-oscillation circuit. A capacitor may be connected in parallel to or in series with the coil 4 so that the voltage change and/or the current change in the coil 4 increases. Further, a driving coil for forming alternating electromagnetic field may be arranged in the detection space in addition to the detection coil 4. The detection coil 4 may detect an alternating voltage generated by electromagnetic induction of the alternating electromagnetic field.

The received alternating voltage is detected and smoothed to obtain the amplitude and/or the frequency of the alternating voltage so that change of the electromagnetic impedance of the detection coil 4 is detected. When the conductor approaches the detection coil 4, the electromagnetic impedance is changed (e.g., reduced) by the eddy current loss. When the soft magnetic material approaches the detection coil 4, the electromagnetic impedance is also changed (e.g., increased).

The detection circuit 2 for the electromagnetic impedance sensor may be a conventional circuit.

The detection coil 4 is shown in FIG. 2. The coil 4 includes a conductive wire 1 with an insulation coat for providing the coil 4. The conductive wire 1 has a first end as a start terminal or start point 30 of the coil 4 and a second end as an end terminal or end point 40.

The coil 4 includes longitudinal sides 11, 13, 15, 17, 19, 21, 23, 25 and latitudinal sides 12, 14, 16, 18, 20, 22, 24, 26, which provide a figure eight. Specifically, each longitudinal side 11, 13, 15, 17, 19, 21, 23, 25 extends along with a Y-direction, which is perpendicular to an arrangement direction of the figure eight. Each latitudinal sides 12, 14, 16, 18, 20, 22, 24, 26 extends along with a X-direction, which is parallel to the arrangement direction of the figure eight. The longitudinal sides 11, 13, 15, 17, 19, 21, 23, 25 and the latitudinal sides 12, 14, 16, 18, 20, 22, 24, 26 are alternatively arranged, respectively. The end terminal 40 is disposed adjacent to the start terminal 30. Here, the X-direction represents the arrangement direction and the latitudinal direction, and the Y-direction represents the longitudinal direction. In FIG. 2, i represents a current flowing direction at a certain time in a certain half-wave period.

Thus, the coil 4 provides first and second portions 5, 6, each of which has a two-turn coil. The first portion 5 includes the longitudinal sides 11, 19, 13, 21 and the latitudinal sides 12, 20, 18, 26, and the second portion 6 includes the longitudinal sides 15, 23, 17, 25 and the latitudinal sides 16, 24, 14, 22.

Since the first and second portions 5, 6 are adjacent to each other, the longitudinal sides 13, 21, 17, 25 are almost overlapped or adjacent to each other so that they 13, 21, 17, 25 are arranged in parallel to each other. Accordingly, the longitudinal sides 13, 21, 17, 25 also provide consecutive sides. In this embodiment, one conductive wire 1 provides the detection coil 4 having a rectangular shape with a length L and a width W. At the center of the rectangular shape, four sides 13, 17, 21, 25 are arranged, and the four sides 13, 17, 21, 25 are almost in parallel to each other, and have the same current flowing direction. Accordingly, sensitivity at the center portion of the detection coil 4 is prevented from being reduced, compared with a conventional art. Here, the center portion of the detection coil 4 is a center portion of an open surface of the coil 4, and the sensitivity along with an axis of the coil 4 is prevented from being reduced. The axis of the coil 4 is perpendicular to the open surface of the coil 4. Thus, the sensitivity of the sensor does not fluctuate so that the sensor has high detection accuracy.

In the conventional art, the sensitivity at the center portion of a detection coil is reduced, since the magnetic flux at the center portion is smaller than that at a periphery portion. Specifically, in a precise sense, the electromagnetic field generated by the detection coil 4 is provided by vectorial sum of the electromagnetic field generated by each side. Each side as a conductor generates the electromagnetic field around the side. The electromagnetic field near the conductor is stronger than that far from the conductor. A plane on which a detection object is disposed is spaced apart from the opening surface of the coil 4 by a distance between the plane and the opening surface along with the coil axis of the coil 4. Thus, the electromagnetic field along with the coil axis, which is generated by each side, is not reduced, compared with the electromagnetic field along with the plane parallel to the opening surface. However, in the conventional art, as the diameter of the coil increases, the sensitivity at the center portion is much reduced. This difficulty is improved by the construction of the detection coil 4 shown in FIG. 2. Further, the figure eight coil 4 is easily formed, i.e., a winding step for forming the coil 4 is easy to perform.

Although the coil 4 shown in FIG. 2 is a two-turn coil, the number of turns in the coil 4 may be different from two.

In FIG. 2, the consecutive side 13, 21 and the other consecutive side 17, 25 intersect each other by a predetermined angle. Thus, the electromagnetic field near the consecutive sides 13, 17, 21, 25, which is provided by current sum larger than current sum at other portions, is restricted.

Second Embodiment

Figure 3:
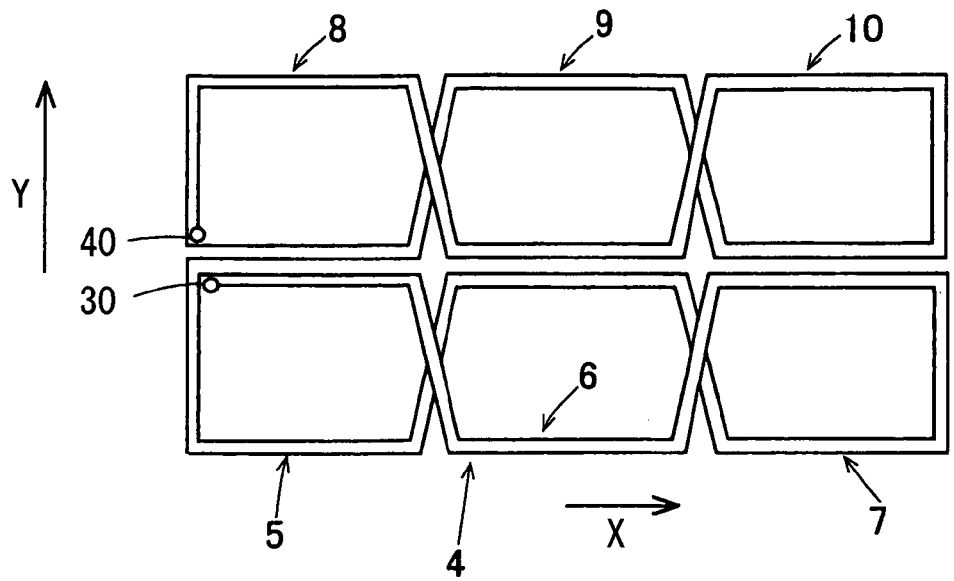
FIG. 3 is a plan view showing a detection coil in the sensor according to a second embodiment of the present disclosure.

FIG. 3 shows another detection coil 4 according to a second embodiment of the present disclosure. The coil 4 further includes third to sixth portions 7-10. The third portion 7 is adjacent to the second portion 6 in the X-direction. The fourth portion 8 is adjacent to the first portion 5 in the Y-direction. Here, the X-direction provides a first arrangement direction, and the Y-direction provides a second arrangement direction. The fifth portion 9 is adjacent to the second portion 6 in the Y-direction, and the sixth portion 10 is adjacent to the third portion 7 in the Y-direction. The fourth to sixth portions 8-10 are arranged line-symmetric to the first to third portions 5-8. The coil 4 composed of the first to sixth portions 5-10 is formed from one wire 1.

The coil 4 is formed such that the first to third portions 5-7 are arranged in the X-direction, and then, the fourth to sixth portions 8-10 are arranged in the X-direction, which are adjacent to the first to third portions 5-7 along with the Y-direction. Thus, the detection coil 4 having an almost rectangular shape with the length of L and the width of 2 W is formed. In six portions 5-10 of the coil 4, two consecutive sides have the same current flowing direction, and are adjacent to each other. The sensitivity reduction at the center of the coil 4 is much restricted. Thus, the sensitivity of the sensor does not fluctuate so that the sensor has high detection accuracy.

Third Embodiment

Figure 4:
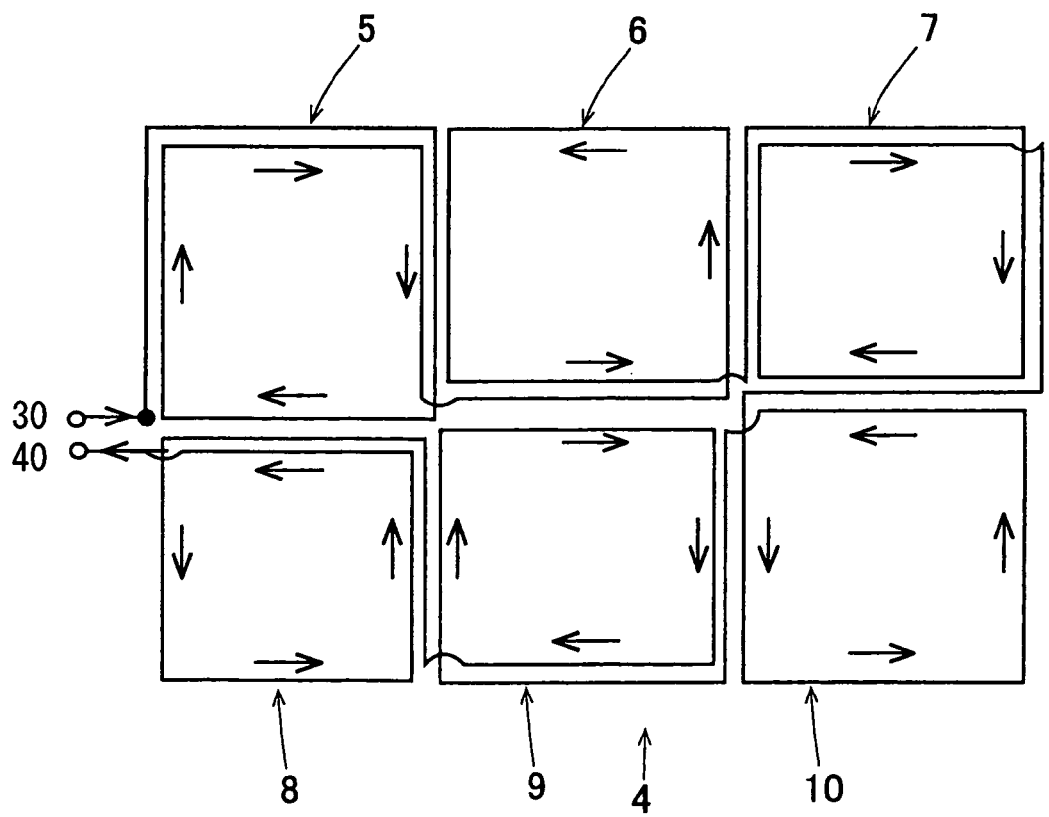
FIG. 4 is a plan view showing a detection coil in the sensor according to a third embodiment of the present disclosure.

FIG. 4 shows the detection coil 4 according to a third embodiment of the present disclosure. The coil 4 is formed from one wire 1. Specifically, wire arrangement, i.e., winding arrangement in FIG. 4 is different from in FIG. 3. However, the coil 4 has similar arrangement of the portions 5-10. Thus, sensitivity reduction at the center of the coil 4 is much restricted. Thus, the sensitivity of the sensor does not fluctuate so that the sensor has high detection accuracy.

Fourth Embodiment

Figure 5:
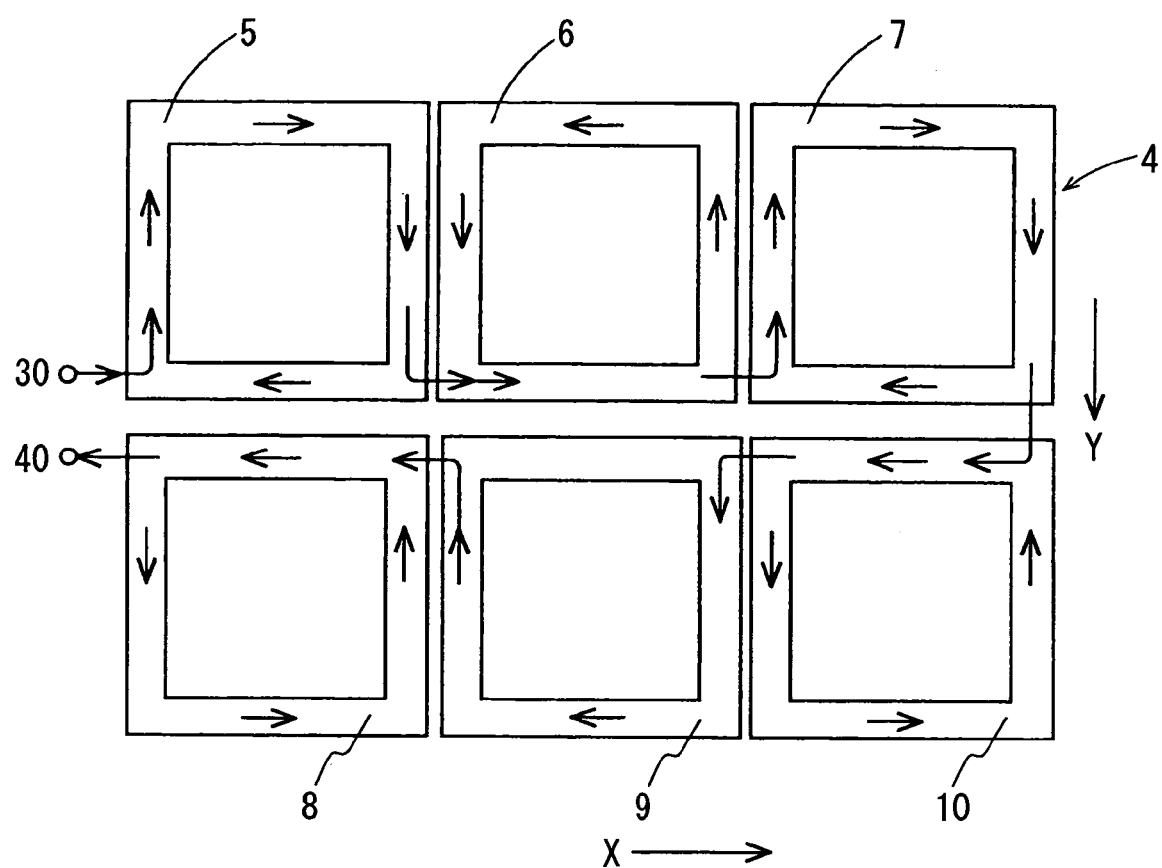
FIG. 5 is a plan view showing a detection coil in the sensor according to a fourth embodiment of the present disclosure.

FIG. 5 shows the detection coil 4 according to a fourth embodiment of the present disclosure. The coil 4 is formed such that the first portion 5 is formed by winding the wire 1 with multiple turns to form a multiple-turn coil, and then, the second portion 6 is formed by winding the wire 1 with multiple turns, and so on. When one portion is ended, the wire 1 is bent at a right angle, and then, next portion is formed. Thus, two consecutive sides in two portions have the same current flowing direction, and are adjacent to each other. Thus, the sensitivity of the sensor does not fluctuate so that the sensor has high detection accuracy.

Fifth Embodiment

Figure 6:
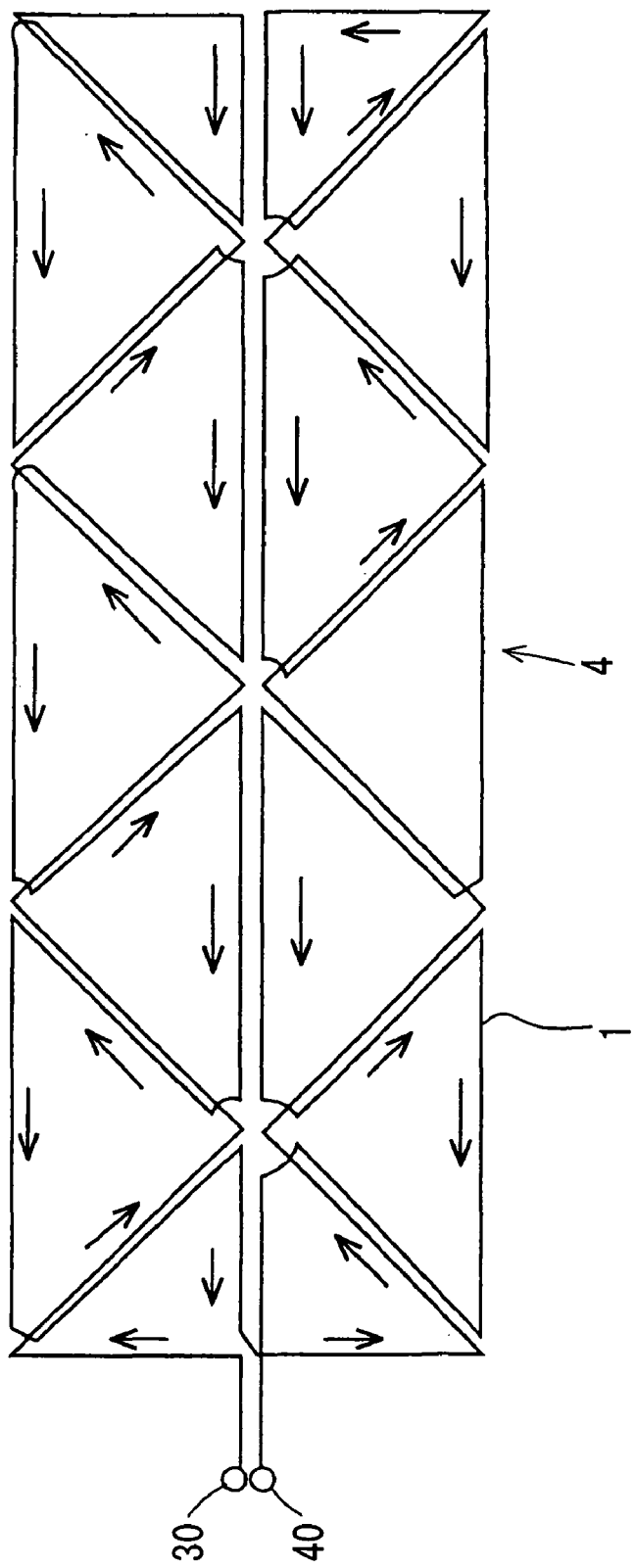
FIG. 6 is a plan view showing a detection coil in the sensor according to a fifth embodiment of the present disclosure.

FIG. 6 shows the detection coil 4 according to a fifth embodiment of the present disclosure. The coil 4 has multiple portions, each of which has triangle coil opening surface. The coil 4 is formed from one wire 1, and two consecutive sides in two portions have the same current flowing direction. Thus, the sensitivity of the sensor does not fluctuate so that the sensor has high detection accuracy.

(Modifications)

In FIG. 2, to reduce the magnetic field generated by the consecutive sides 13, 21, 17, 25, a distance between two consecutive sides may be increased. Specifically, the consecutive sides 13, 21, 17, 25 may be arranged to broaden the distance therebetween in the X-direction. The distance between two consecutive sides is appropriately determined.

Although each portion 5-10 of the coil 4 has a square shape or a triangle shape, each portion may have another shape such as a trapezoid shape, a polygonal shape and a substantial circular shape. For example, when each portion has a substantial circular shape, adjacent two portions may be partially overlapped or partially intersect. Further, each portion may be completely adjacent to each other or overlapped each other.

Sixth Embodiment

Figure 7:
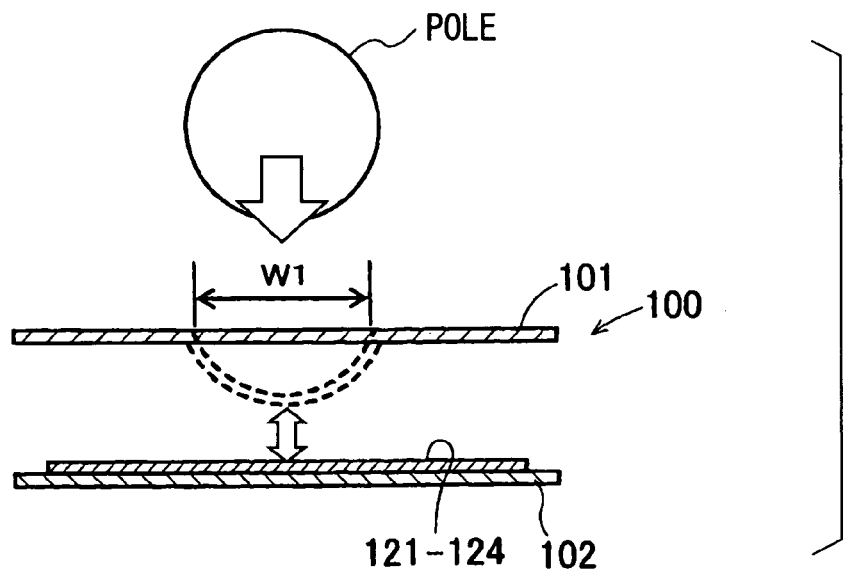
FIG. 7 is a partial cross sectional view showing an inside of a door of a vehicle.
Figure 8A:
FIGS. 8A to 8D are plan views showing detecting coils as an object.
Figure 8B:
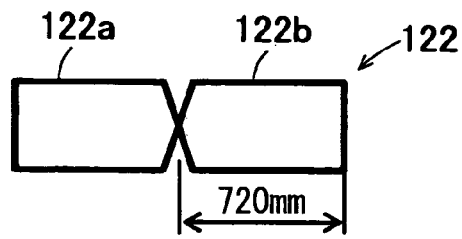
Figure 8C:
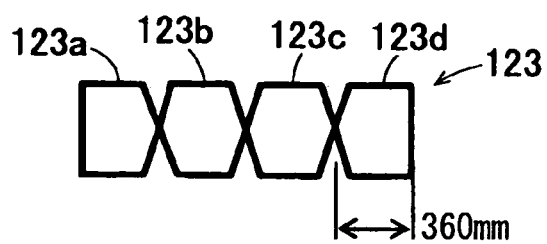
Figure 8D:
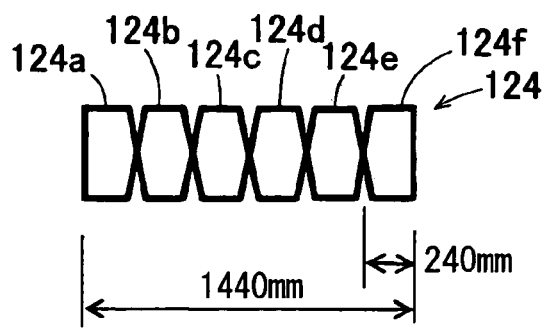

An electromagnetic impedance sensor may be used for a lateral collision detector for a vehicle. FIG. 7 shows an inside of a door 100 of a vehicle. The door 100 includes an outer plate 101 and an inner plate 102. The outer plate 101 is disposed on an outside of the vehicle, and the inner plate 102 is disposed on an inside of the vehicle. The inner plate 102 faces the outer plate 101, and is spaced apart from the outer plate 101. The detection coil 4 is mounted on a side of the inner plate 102, the side facing the outer plate 101.

A pole laterally collides with the door 100. Under a lateral collision condition defined in US FMVSS214, the pole has a cylindrical column with a diameter of ten inches (corresponding to 255 mm). The pole is crashed to the door 100 with a collision speed of 20 mph (corresponding to 32 km/hour). After ten milliseconds from the collision, rate of impedance change of the detection coil 4 is analyzed. Here, it is required for the sensor to detect the collision within 10 milliseconds in view of passenger protection.

When the pole collides with the collision speed of 20 mph, the outer plate 101 is deformed to be a shape shown as a dotted line in FIG. 7 after ten milliseconds from the collision. Thus, the outer plate 101 is deformed to be a circular shape corresponding to the pole. A width W1 of a concavity corresponding to the deformation of the outer plate 101 is 240 mm.

Here, the detection coil 4 has one of four types shown in FIGS. 8A to 8D. The first coil 121 shown in FIG. 8A has a rectangular shape with a longitudinal side of 1440 mm, which is parallel to a vehicle length direction, i.e., a vehicle horizontal direction. The first coil 121 has no partial coil. The second coil 122 shown in FIG. 8B, the longitudinal side of the second coil 122 is 1440 mm, and the coil 122 has two partial coils 122a, 122b. Thus, the second coil 122 corresponds to the coil shown in FIG. 2. The length of each partial coil 122a, 122b in the vehicle length direction is 720 mm. The third coil 123 shown in FIG. 8C has the length of the longitudinal side of 1440 mm, and the coil 123 has four partial coils 123a-123d. The length of each partial coil 123a-123d in the vehicle length direction is 360 mm. The fourth coil 124 shown in FIG. 8D has the length of the longitudinal side of 1440 mm, and the coil 124 has six partial coils 124a-124f. The length of each partial coil 124a-124f in the vehicle length direction is 240 mm.

Each coil 121-124 is tested under a condition that a collision position of the pole at the door 100 is shifted. Specifically, the center of the collision position is shifted from the center of the coil 121-124 to one end of the detection coil 4.

Figure 9:
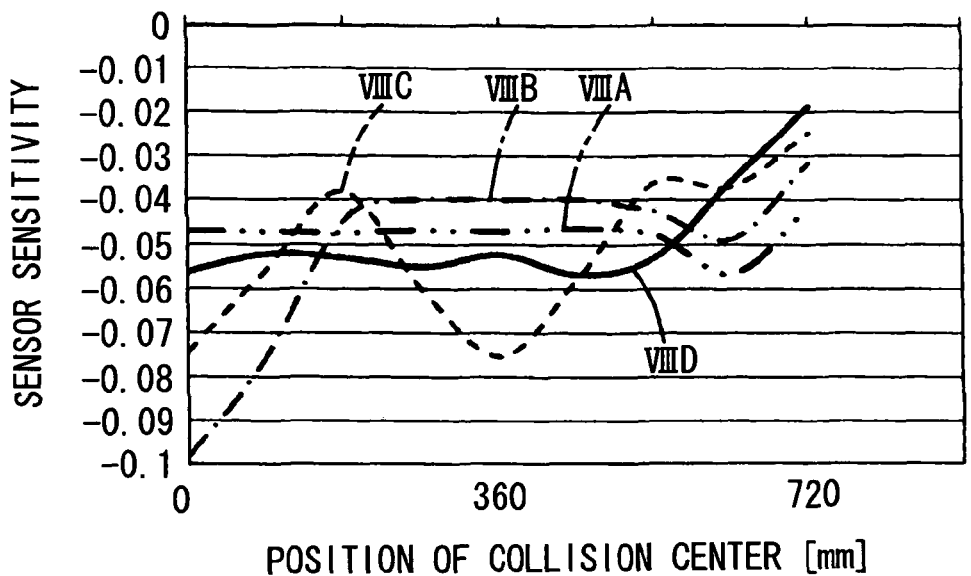
FIG. 9 is a graph showing a relationship between a position and a sensor sensitivity.

The test results are shown in FIG. 9. VIIIA represents the result of the first coil 121, VIIIB represents the result of the second coil 122, VIIIC represents the result of the third coil 123, and VIIID represents the result of the fourth coil 124. Zero in the horizontal axis that shows a position from the collision center means that the center position of the pole is disposed at the center of the coil 121-124, i.e., a curvature center of the deformed outer plate 101 is disposed at the center of the coil 121-124. The vertical axis shows sensor detection sensitivity, i.e., rate of impedance change of the detection coil 4. Minus means that the impedance is reduced. The rate of impedance change is calculated by dividing the impedance after collision by the impedance before collision.

As shown in FIG. 9, when the detection coil 4 is the first coil 121 which is a large one coil, the absolute value of the rate of impedance change is about 0.046 in a range between zero and 550 mm.

When the detection coil 4 is the second coil 122, the absolute value of the rate of impedance change is maximized when the collision center is near the center of the detection coil 122, so that the sensitivity of the coil 122 is high. However, as the collision center is displaced from the center of the detection coil 122, the detection sensitivity is reduced.

When the detection coil 4 is the third coil 123, the absolute value of the rate of impedance change is changed with a wave pattern. At a certain position, the absolute value of the rate of impedance change in the curve VIIIC is larger than that in the curve VIIIA corresponding to the first coil 121. At another certain position, the absolute value of the rate of impedance change in the curve VIIIC is smaller than that in the curve VIIIA. Thus, the detection sensitivity is deviated, and there is some range in which the sensitivity is smaller than that of the first coil 121.

When the detection coil 4 is the fourth coil 124, the absolute value of the rate of impedance change is almost constant, i.e., 0.055. Specifically, the absolute value of the rate of impedance change is stabilized without depending on the position of the collision center is disposed. Further, the absolute value of the rate of impedance change in the curve VIIID is always higher than that in the curve VIIIA.

Thus, the width of the partial coil in the horizontal direction of the vehicle is set to be smaller than the width of deformation of the outer plate 101 caused by the collision of the pole, so that the detection sensitivity is increased. Further, the deviation of the sensitivity with regard to the collision position is reduced.

Thus, when the width of the partial coil in the horizontal direction of the vehicle is set to be smaller than 240 mm, the system can detect the collision of the pole within 10 milliseconds. Further, when the width of the partial coil in the horizontal direction of the vehicle is set to be smaller than 200 mm, the system can detect the collision of the pole within 6 milliseconds.

Seventh Embodiment

Figure 10:
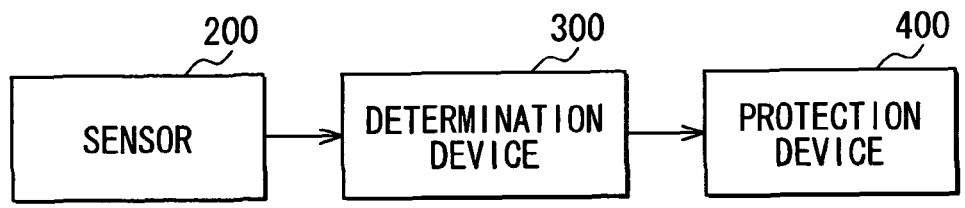
FIG. 10 is a block diagram showing a passenger protection system.

By using the above electromagnetic impedance sensor, a passenger protection system for a vehicle is formed. FIG. 10 shows the passenger protection system.

The system includes an electromagnetic impedance sensor 200, a collision determination device 300 and a passenger protection device 400. The sensor 200 includes one of sensors shown in FIGS. 1-9. The collision determination device 300 determines collision between the vehicle and an object on the basis of the output from the sensor 200. For example, when the sensor 200 is mounted on the door 1, the collision determination device 300 determines whether the object collides with the door 1. This determination is performed based on the impedance change. The protection device 400 is, for example, an air bag system. Based on the determination of the determination device 300, the protection device 400 functions.

Figure 11:
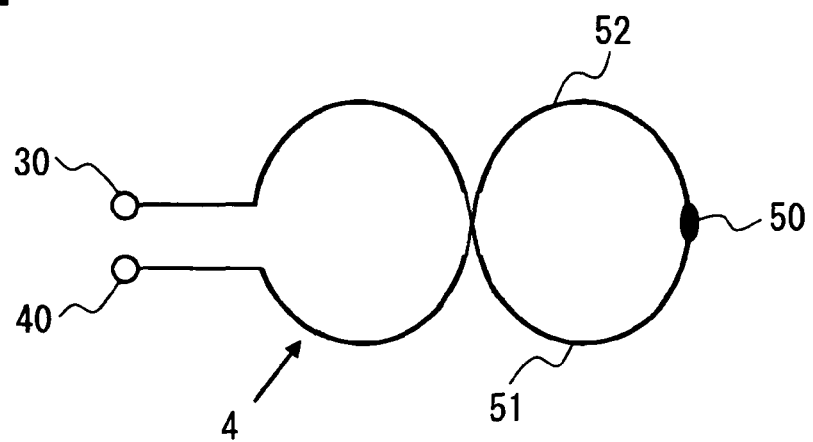
FIG. 11 is a plan view showing an example of a detection coil.

Here, the partial coil may be a circular coil shown in FIG. 11. The coil 4 includes a middle portion 50, which is almost a middle point of the coil length. The coil 4 includes an outward coil 51 as a first coil and a homeward coil 52 as a second coil. The outward coil 51 is disposed from the start terminal 30 to the middle portion 50, and the homeward coil 52 is disposed from the middle portion 50 to the end terminal 40. Thus, a part of the outward coil 51 and a part of the homeward coil 52 provide a partial coil, and the other part of the outward coil 51 and the other part of the homeward coil 52 provide another partial coil. The outward coil 51 provides two halfway turns, which are connected to each other. The homeward coil 52 also provides two halfway turns, which are connected to each other.

The above disclosure has the following aspects.

According to an aspect of the present disclosure, an electromagnetic impedance sensor detects an object with contact-free. The object is made of conducting material or soft magnetic material. The sensor includes: a detection coil having a coil surface, which faces a detection area in which the object is disposed; and a detection circuit for supplying alternating electricity to the detection coil and for detecting the object by measuring change of an electromagnetic impedance in the detection coil. The detection coil includes a plurality of coil portions, which are provided by one wire. Each coil portion is disposed on the coil surface to have a predetermined arrangement. The plurality of coil portions is sequentially arranged along with a first direction.

In the above sensor, since the coil portions are coupled in series with each other, the detection coil commonly supplies the electricity and commonly measures the impedance change of the detection coil. Thus, the circuit construction is simplified.

Further, one wire provides multiple coil portions, so that fluctuation of magnetic flux density is reduced, and detection accuracy of the sensor is improved.

Alternatively, the plurality of coil portions may include one coil portion adjacent to another coil portion. The one coil portion has a side, which is adjacent to a corresponding side of the another coil portion. The side of the one coil portion extends along with a predetermined direction, and the corresponding side of the another coil portion extends along with the predetermined direction. The side of the one coil portion has a current flowing direction, which is the same as a current flowing direction of the corresponding side of the another coil portion. The current flowing direction of the one side of the one coil portion is parallel to the corresponding side of the another coil portion. Thus, the magnetic flux generated by the one side and the magnetic flux generated by the corresponding side reinforce each other. Thus, detection sensitivity at each portion of the detection area is prevented from fluctuating, so that the sensor has high detection accuracy.

Alternatively, the first direction is perpendicular to the second direction. Each coil portion includes a first side and a second side. The first side extends along with the first direction, and the second side extends along with the second direction. The plurality of coil portions is arranged along with the first direction. Further, the detection coil may further include an outward coil and a homeward coil. The outward coil provides a plurality of first halfway turns, which are sequentially connected to each other. The homeward coil provides a plurality of second halfway turns, which are sequentially connected to each other. One of the plurality of first halfway turns and a corresponding one of the plurality of second halfway turns provide one of the coil portions.

In the above cases, although the detection coil includes multiple coil portions arranged along with the first direction, a manufacturing process for the detection coil is simplified. Further, the number of connections of the detection coil is reduced. Thus, reliability of the sensor is improved.

Further, the detection coil may have a double-turn figure-eight shape, and the second side of the one coil portion intersects with the second side of the another coil portion. Further, the plurality of coil portions may include first to sixth coil portions. The first to third coil portions are arranged along with the first direction, and the fourth to sixth coil portions are arranged along with the first direction, and the first to third coil portions and the fourth to sixth coil portions are arranged along with the second direction. Each coil portion provides an at least two-turn coil. Furthermore, each coil portion may provide a multiple-turn coil. The one wire has a first end and a second end. The first end is adjacent to the second end. The one coil portion and the another coil portion are connected with the one wire in such a manner that the one wire is bent by a straight angle at a connection portion between the one coil portion and the another coil portion. Furthermore, each coil portion may have a square shape. The second coil portion is adjacent to the first coil portion along with the first direction so that the second side of the first coil portion is adjacent to the second side of the second coil portion. The second side of the first coil portion has a current flowing direction, which is the same as a current flowing direction of the second side of the second coil portion, the current flowing direction being parallel to the second direction. The fourth coil portion is adjacent to the first coil portion along with the second direction so that the first side of the first coil portion is adjacent to the first side of the fourth coil portion. The first side of the first coil portion has another current flowing direction, which is the same as a current flowing direction of the first side of the fourth coil portion, the another current flowing direction being parallel to the first direction.

Alternatively, the object may be an outer plate of a door of a vehicle. The detection coil is disposed on a side of an inner plate of the door, the side facing the outer plate. The inner plate is spaced apart from the outer plate. Each coil portion has a width in a horizontal direction of the vehicle. The width is equal to or smaller than 240 mm. In this case, the detection sensitivity is increased. Further, the deviation of the sensitivity with regard to the collision position is reduced.

According to a second aspect of the present disclosure, a passenger protection system includes: the electromagnetic impedance sensor according to the first aspect of the present disclosure; a collision determination element for determining collision between the vehicle and an external body based on an output from the sensor; and a passenger protection element for protecting an passenger of a vehicle. The passenger protection element functions based on determination of the collision determination element.

In the above system, the passenger protection element surely functions based of the signal from the electromagnetic impedance sensor, which has detection accuracy.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An electromagnetic impedance sensor for detecting an object with contact-free, wherein the object is made of conducting material or soft magnetic material, the sensor comprising:

a detection coil having a coil surface, which faces a detection area in which the object is disposed; and a detection circuit for supplying alternating electricity to the detection coil and for detecting the object by measuring change of an electromagnetic impedance in the detection coil, wherein the detection coil includes a plurality of coil portions, which are provided by one wire, each coil portion is disposed on the coil surface to have a predetermined arrangement, the plurality of coil portions is sequentially arranged along with a first direction and includes one coil portion adjacent to another coil portion, the one coil portion has a side, which is adjacent to a corresponding side of the another coil portion, the side of the one coil portion extends along with a second direction, and the corresponding side of the another coil portion extends along with the second direction, the first direction is different from and perpendicular to the second direction, the side of the one coil portion has a current flowing direction, which is the same as a current flowing direction of the corresponding side of the another coil portion, each coil portion includes a first side and a second side, the first side extends along with the first direction, and the second side extends along with the second direction, and wherein the plurality of coil portions includes first to sixth coil portions, the first to third coil portions are arranged along with the first direction, and the fourth to sixth coil portions are arranged along with the first direction, the first and fourth coil portions, the second and fifth coil portions and the third and sixth coil portions are arranged along with the second direction, respectively, and each coil portion provides an at least two-turn coil.

2. The sensor according to claim 1, wherein each coil portion provides a multiple-turn coil, the one wire has a first end and a second end, the first end is adjacent to the second end, and the one coil portion and the another coil portion are connected with the one wire in such a manner that the one wire is bent by a straight angle at a connection portion between the one coil portion and the another coil portion.

3. The sensor according to claim 2, wherein each coil portion has a square shape, the second coil portion is adjacent to the first coil portion along with the first direction so that the second side of the first coil portion is adjacent to the second side of the second coil portion, the second side of the first coil portion has a current flowing direction, which is the same as a current flowing direction of the second side of the second coil portion, the current flowing direction being parallel to the second direction, the fourth coil portion is adjacent to the first coil portion along with the second direction so that the first side of the first coil portion is adjacent to the first side of the fourth coil portion, and the first side of the first coil portion has another current flowing direction, which is the same as a current flowing direction of the first side of the fourth coil portion, the another current flowing direction being parallel to the first direction.

4. A passenger protection system comprising:

an electromagnetic impedance sensor including;

a detection coil having a coil surface, which faces a detection area in which an object is disposed; and a detection circuit for supplying alternating electricity to the detection coil and for detecting the object by measuring change of an electromagnetic impedance in the detection coil, wherein the detection coil includes a plurality of coil portions, which are provided by one wire, each coil portion is disposed on the coil surface to have a predetermined arrangement, and the coil portions are non-concentrically positioned and sequentially arranged along with a first direction;

a collision determination element for determining collision between the vehicle and an external body based on an output from the sensor; and a passenger protection element for protecting a passenger of a vehicle, wherein the passenger protection element functions based on determination of the collision determination element;

wherein one of the plurality of coil portions includes at least two sides, wherein each of the at least two sides is closer to another side of another one of the plurality of coil portions than any other sides of the plurality of coil portions and has a current flowing direction, which is substantially the same as a current flowing direction of the another side of the another one of the plurality of coil portions.

5. The passenger protection system according to claim 4, wherein the plurality of coil portions includes one coil portion adjacent to another coil portion, the one coil portion has a side, which is adjacent to a corresponding side of the another coil portion, the side of the one coil portion extends along with a second direction, and the corresponding side of the another coil portion extends along with the second direction, the first direction is different from the second direction, and the side of the one coil portion has a current flowing direction, which is the same as a current flowing direction of the corresponding side of the another coil portion.

6. The passenger protection system according to claim 5, wherein the first direction is perpendicular to the second direction,
each coil portion includes a first side and a second side, and
the first side extends along with the first direction, and the second side extends along with the second direction.

7. The passenger protection system according to claim 6, wherein
the detection coil has a double-turn figure-eight shape, and
the second side of the one coil portion intersects with the second side of the another coil portion.

8. The passenger protection system according to claim 6, wherein
the plurality of coil portions includes first to sixth coil portions,
the first to third coil portions are arranged along with the first direction, and the fourth to sixth coil portions are arranged along with the first direction,
the first and fourth coil portions, the second and fifth coil portions and the third and sixth coil portions are arranged along with the second direction, respectively, and
each coil portion provides an at least two-turn coil.

9. The passenger protection system according to claim 8, wherein
each coil portion provides a multiple-turn coil,
the one wire has a first end and a second end,
the first end is adjacent to the second end, and
the one coil portion and the another coil portion are connected with the one wire in such a manner that the one wire is bent by a straight angle at a connection portion between the one coil portion and the another coil portion.

10. The passenger protection system according to claim 9, wherein
each coil portion has a square shape,
the second coil portion is adjacent to the first coil portion along with the first direction so that the second side of the first coil portion is adjacent to the second side of the second coil portion,
the second side of the first coil portion has a current flowing direction, which is the same as a current flowing direction of the second side of the second coil portion, the current flowing direction being parallel to the second direction,
the fourth coil portion is adjacent to the first coil portion along with the second direction so that the first side of the first coil portion is adjacent to the first side of the fourth coil portion, and
the first side of the first coil portion has another current flowing direction, which is the same as a current flowing direction of the first side of the fourth coil portion, the another current flowing direction being parallel to the first direction.

11. The passenger protection system according to claim 5, wherein
the plurality of coil portions are arranged along with both of the first direction and second direction.

12. The passenger protection system according to claim 5, wherein
each coil portion has a square shape, a triangular shape, a polygonal shape or a circular shape.

13. The passenger protection system according to claim 4, wherein
the detection coil further includes an outward coil and a homeward coil,
the outward coil provides a plurality of first halfway turns, which are sequentially connected to each other,
the homeward coil provides a plurality of second halfway turns, which are sequentially connected to each other, and
one of the plurality of first halfway turns and a corresponding one of the plurality of second halfway turns provide one of the coil portions.

14. The passenger protection system according to claim 4, wherein
the object is an outer plate of a door of a vehicle,
the detection coil is disposed on a side of an inner plate of the door, the side facing the outer plate,
the inner plate is spaced apart from the outer plate,
each coil portion has a width in a horizontal direction of the vehicle, and
the width is equal to or smaller than 240 mm.

15. The passenger protection system according to claim 4, wherein
the one side of the one of the plurality of coil portions intersects by a predetermined angle with the another side of the another one of the plurality of coil portions.

* * * * *